Oct. 15, 1957 R. G. EMRICK 2,809,845
QUICK DETACHABLE AND ADJUSTABLE DIE HOLDER CHUCKS
Filed Oct. 4, 1954
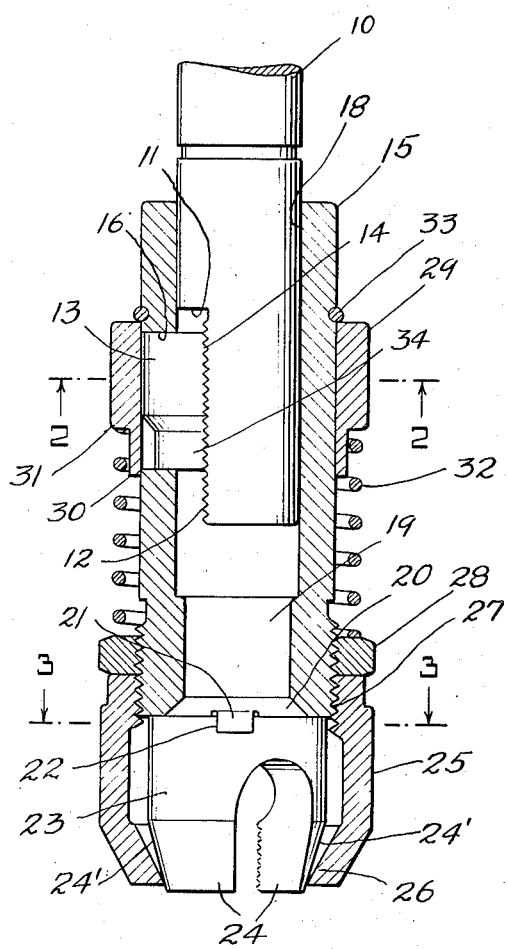
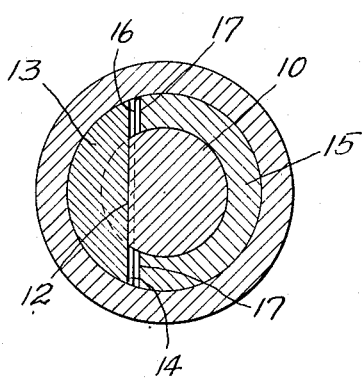
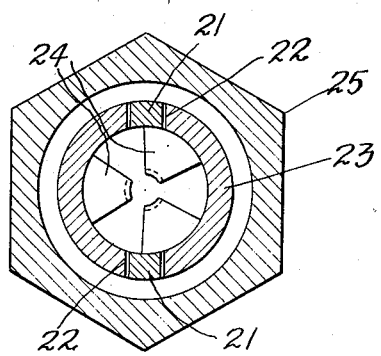
INVENTOR.
ROBERT G. EMRICK
BY
ATTORNEY

United States Patent Office 2,809,845
Patented Oct. 15, 1957

2,809,845

QUICK DETACHABLE AND ADJUSTABLE DIE HOLDER CHUCKS

Robert G. Emrick, Manhasset, N. Y.; Agnes G. Emrick, administratrix of said Robert G. Emrick, deceased Application October 4, 1954, Serial No. 459,956

4 Claims. (Cl. 279—82)

This invention relates to chucks for supporting threading dies. More particularly, the invention deals with a chuck having means for quickly coupling, as well as, adjusting the same with a drive spindle and, at the same time, keying the chuck to the spindle.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a longitudinal sectional view through a chuck made according to my invention with parts of the construction shown in elevation and indicating the mounting upon a drive spindle.

Fig. 2 is a section on the line 2—2 of Fig. 1; and

Fig. 3 is a section on the line 3—3 of Fig. 1.

In Fig. 1 of the drawing, I have shown the general assemblage of my improved die holder chuck mounted upon a drive spindle 10. The spindle 10 has a cutout side, as indicated at 11, to produce a transverse flat tooth surface 12, with which a crescent-type key 13 is adjustably coupled, the key 13 having transverse teeth 14 registering with the teeth 12 in adjusting the key as well as the tubular body portion 15 of the chuck longitudinally of the spindle 10.

The crescent-type key 13 also fits in an arc-shaped aperture 16 formed in the wall of the body 15 and the ends 17 of the body 15, engaging the side end portions of the key 13 which extend beyond the spindle 10, may have tooth engagement with the teeth 14 or, in some instances, can be plain.

The tubular chuck body 15 has a bore 18 snugly receiving the spindle 10. The lower end portion of the body has a reduced bore 19 terminating in a flared portion 20 and this flared portion and lower end of the body 15 has, on opposed walls, downwardly extending key lugs 21, note Fig. 3 of the drawing, one of the lugs 21 being shown in elevation in Fig. 1 of the drawing.

The lugs 21 are adapted to seat in key recesses 22 of a threading die 23, the die having, at its lower portion, three die jaws 24 for cutting threads on a suitable workpiece.

The die 23 is clamped to the lower end of the body 15 by a sleeve nut 25 having a contracted lower portion 26 bearing directly upon the outer bevelled walls 24' of the die jaws 14. The sleeve nut 25 is in threaded engagement with the lower end of the body 15, as seen at 27, and also mounted on the threaded portion of the body is a lock nut 28 securely fixing the sleeve nut 25 in operative position.

Slidably mounted upon the upper portion of the body 15 is a collar 29 having a reduced lower end 30 forming a shoulder 31, against which the upper end of a coil spring 32 seats, the lower end portion of the spring 32 seating upon the nut 28.

Mounted in a groove of the body 15 is a spring ring 33, which forms a stop, checking upward movement of the collar 29. The collar 29 normally overlies the key 13 in the manner clearly shown in Fig. 1 of the drawing to support the key in operative engagement with the spindle 10. However, by moving the collar 29 downwardly until the upper end of the collar registers with a lower reduced portion 34 on the key 13, the key 13 can be freed for outward radial movement to disengage the teeth 12 of the spindle 10, thus facilitating quick detachment of the chuck body from the spindle or adjustment of the chuck body longitudinally of the spindle into different positions.

It will be apparent that the chuck constitutes an assembled unit, including all of the parts, aside from the spindle 10 and, as such, this die holder chuck unit of a particular die characteristic can be quickly coupled and uncoupled with a spindle, as well as adjusted on a spindle. It will be apparent, however, that, whenever desired, the die 23 can be replaced by another die of different characteristics. However, considerable time will be saved in maintaining in a shop complete die holder chuck units of the character described selected from time to time for assemblage with a drive spindle.

With the collar structure disclosed, it will be apparent that accidental displacement of the key 13 from the chuck unit is avoided in limiting the downward movement of the collar 29 by virtue of the reduced sleeve 30. However, for repair or other purposes, the parts can be disassembled by removal of the spring ring 33.

Having fully described my invention, what I claim as new and desire to secure by Letters Patent is:

1. A quick detachable and adjustable coupling for die holder chuck units for use in connection with drive spindles having longitudinally spaced key teeth on a recessed end portion of the spindle, said coupling comprising a tubular body having a bore for the reception of said spindle, the upper portion of the body having an aperture, in which a key segment is arranged, a spring actuated collar slidable on said body and retained normally adjacent the aperture of said body and overlying the key segment therein for retaining said segment in operative position, said segment having key teeth extending the full width thereof operatively engaging the key teeth of the spindle in retaining said unit in predetermined adjusted positions on and against displacement from said spindle, and the teeth of said key segment at end portions thereof operatively engaging teeth on the walls of the apertured part of said body beyond the limits of said spindle.

2. A die holder chuck unit for use in connection with drive spindles, having longitudinally spaced key teeth on a recessed end portion of the spindle, said chuck unit comprising a tubular body having a bore for the reception of said spindle, a die supported in and keyed to the lower portion of said body, the other portion of the body having an aperture, in which a key segment is arranged, a collar slidably mounted on said body, means on said body normally retaining the collar adjacent the aperture of said body and overlying the key segment therein, a coil spring on the body engaging said collar for retaining said segment in operative position, the lower end of the tubular body being externally threaded, means in threaded engagement with said threaded end forming a seat for said spring, said segment having key teeth extending the full width thereof operatively engaging the key teeth of the spindle in retaining said unit in predetermined adjusted positions on and against displacement from said spindle, the teeth of said key segment, at end portions thereof, operatively engaging teeth on the walls of the apertured part of said body beyond the limits of said spindle, and said segment having a recessed portion facilitating outward radial movement of the segment when freed by said collar in uncoupling the chuck unit with respect to the spindle.

3. A die holder chuck unit of the character described, comprising a tubular body, a spindle mounted in said body and having longitudinally spaced key teeth on a recessed end portion thereof, a key segment mounted in the upper end portion of said body and having teeth operatively engaging the teeth of said spindle, said segment having a reduced lower end portion, a collar slidably mounted on the body, a coil spring mounted on the body and urging said collar in an upward direction on said body, means on the body supporting the collar in position overlying said segment in support of the segment in operative position, the lower end of the tubular body being externally threaded, means in threaded engagement with said threaded end forming a seat for said spring, and said collar being movable against the action of said spring into position to permit outward radial movement of the key segment in registration of the collar with the reduced portion of said key segment.

4. A die holder chuck unit of the character described, comprising a tubular body, a spindle mounted in said body and having longitudinally spaced key teeth on a recessed end portion thereof, a key segment mounted in the upper end portion of said body and having teeth operatively engaging the teeth of said spindle, said segment having a reduced lower end portion, a collar slidably mounted on the body, a coil spring mounted on the body and urging said collar in an upward direction on said body, means on the body supporting the collar in position overlying said segment in support of the segment in operative position, the lower end of the tubular body being externally threaded, means in threaded engagement with said threaded end forming a seat for said spring, said collar being movable against the action of said spring into position to permit outward radial movement of the key segment in registration of the collar with the reduced portion of said key segment, and said key segment engaging walls of said body beyond limits of said spindle in keying the key segment to said body and restricting movement of the key segment in an inward radial direction on said body.

References Cited in the file of this patent

UNITED STATES PATENTS

| | | |
|---|---|---|
| 2,367,196 | Butler | Jan. 16, 1945 |
| 2,391,671 | Berg | Dec. 25, 1945 |
| 2,401,305 | Judge | June 4, 1946 |
| 2,680,636 | Griffin | June 8, 1954 |
| 2,689,741 | Emrick | Sept. 21, 1954 |